United States Patent
Ohba

(10) Patent No.: US 10,032,098 B2
(45) Date of Patent: Jul. 24, 2018

(54) IMAGE FORMING APPARATUS HAVING FUNCTION FOR DETERMINING WHETHER TO CHANGE OUTPUT CONTROL CONTENT FOR DESIGNATED SHEETS DEPENDING ON WHETHER DESIGNATED SHEETS ARE TO BE OUTPUT AS REPLACEMENT MEDIA, AND IMAGE FORMATION MANAGEMENT APPARATUS AND COMPUTER-READABLE RECORDING MEDIUM HAVING STORED THEREIN IMAGE FORMATION CONTROL PROGRAM HAVING THE SAME

(71) Applicant: KONICA MINOLTA, INC., Chiyoda-ku, Tokyo (JP)

(72) Inventor: Shin Ohba, Aichi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/412,786

(22) Filed: Jan. 23, 2017

(65) Prior Publication Data

US 2017/0228622 A1 Aug. 10, 2017

(30) Foreign Application Priority Data

Feb. 5, 2016 (JP) ................................. 2016-021015

(51) Int. Cl.
| | |
|---|---|
| *G06F 15/00* | (2006.01) |
| *G06F 3/12* | (2006.01) |
| *G06K 1/00* | (2006.01) |
| *G06K 15/00* | (2006.01) |

(52) U.S. Cl.
CPC ......... *G06K 15/404* (2013.01); *G06F 3/1204* (2013.01); *G06F 3/1206* (2013.01); *G06F 3/1234* (2013.01); *G06F 3/1252* (2013.01); *G06F 3/1264* (2013.01); *G06F 3/1285* (2013.01); *G06K 15/408* (2013.01);
(Continued)

(58) Field of Classification Search
CPC ............... G06K 15/404; G06K 15/408; G06K 2215/0017; G06F 3/1206; G06F 3/1234; G06F 3/1252; G06F 3/1256
USPC ............................... 358/1.13, 1.15, 1.14, 1.1
See application file for complete search history.

(56) References Cited

U.S. PATENT DOCUMENTS

| | | | |
|---|---|---|---|
| 2003/0147093 A1 | 8/2003 | Okamoto et al. | |
| 2010/0002258 A1* | 1/2010 | Shirai | G06F 3/1204 358/1.15 |

(Continued)

FOREIGN PATENT DOCUMENTS

| | | |
|---|---|---|
| JP | 2003231324 A | 8/2003 |
| JP | 2006095849 A | 4/2006 |

(Continued)

*Primary Examiner* — Douglas Tran
(74) *Attorney, Agent, or Firm* — Holtz, Holtz & Volek PC

(57) ABSTRACT

An image forming apparatus includes an image forming unit that outputs an image to a transfer medium on the basis of a job and a control unit that controls the image forming unit. The control unit is capable of outputting all sheets and outputting designated sheets in outputting the job and, when outputting the designated sheets, changes output control content according to whether the designated sheets are output as sheets for replacement media.

21 Claims, 16 Drawing Sheets

(52) U.S. Cl.
CPC ........ *G06K 15/4025* (2013.01); *G06F 3/1256* (2013.01); *G06K 2215/0017* (2013.01)

(56) References Cited

U.S. PATENT DOCUMENTS

| | | |
|---|---|---|
| 2011/0170127 A1 | 7/2011 | Nakamura |
| 2014/0092410 A1* | 4/2014 | Taima .................. G06F 3/1234 358/1.13 |

FOREIGN PATENT DOCUMENTS

| | | |
|---|---|---|
| JP | 2010187079 A | 8/2010 |
| JP | 2011140204 A | 7/2011 |

* cited by examiner

IMAGE FORMING APPARATUS HAVING FUNCTION FOR DETERMINING WHETHER TO CHANGE OUTPUT CONTROL CONTENT FOR DESIGNATED SHEETS DEPENDING ON WHETHER DESIGNATED SHEETS ARE TO BE OUTPUT AS REPLACEMENT MEDIA, AND IMAGE FORMATION MANAGEMENT APPARATUS AND COMPUTER-READABLE RECORDING MEDIUM HAVING STORED THEREIN IMAGE FORMATION CONTROL PROGRAM HAVING THE SAME

BACKGROUND OF THE INVENTION

The present U.S. patent application claims a priority under the Paris Convention of Japanese patent application No. 2016-021015 filed on Feb. 5, 2016, the entirety of which is incorporated herein by references.

FIELD OF THE INVENTION

The present invention relates to an image forming apparatus capable of outputting all sheets and outputting designated sheets in outputting a job, an image formation management apparatus that manages the image forming apparatus, and a computer-readable recording medium having stored therein an image formation control program for controlling the image forming apparatus.

DESCRIPTION OF THE RELATED ART

An image forming apparatus writes, with an image forming unit, an image onto an image bearing body on the basis of image data of a job and transfers the image onto a transfer medium to output the job.

In outputting the job, usually, a user can output the entire job. Besides, the user can designate only pages desired to be output and output the designated pages rather than outputting all pages. When designating the pages desired to be output, the user can designate the pages using commas, hyphens, or the like and output the pages. For example, when pages are designated as 1, 3, 10-20, a first page, a third page, and tenth to twentieth pages are output to the transfer medium.

Note that, when the user designates and outputs pages, the user sometimes desires to output the pages as pages for replacement. Specifically, after a saved job is output, if a deficiency such as stains or odd tints occurs in transfer media, the user sometimes desires to replace only the sheet (waste paper). For example, when the user desires to replace a second page and a fifth page, the user designates the pages as 2, 5 and outputs only the designated sheets again.

Incidentally, when all sheets of a job are output, the output is performed on the basis of all sheet output time sheet information targeting all the sheets. The all sheet output time sheet information sometimes includes a binding processing mode such as stapling and a booklet or a page stamp. When sheets designated as sheets for replacement are output, if a job operates on the basis of designated stapling or the like, the second and fifth pages are stapled. Trouble occurs because staples have to be removed. On the other hand, if the page stamp operates on the basis of the designated second and fifth pages, the sheets are output with a page number 1 printed on the second page and a page number 2 printed on the fifth page. Therefore, the sheets cannot be replaced.

Note that, Japanese Patent Laid-Open No. 2006-95849 (Patent Literature 1) makes it possible to specify a section to be changed (the number of pages, etc.) by counting the number of sheets of a document before a change, print only a document applied with a change or the like corresponding to the section, and replace a printing result of the section. However, sheet information in an output of a job is not changed. Therefore, the problem cannot be solved.

Japanese Patent Laid-Open No. 2011-140204 (Patent Literature 2) makes it possible to change output setting of a part of pages halfway in a job and output the pages. However, in a method of Patent Literature 2, a user needs to manually change the setting. Therefore, work is troublesome and it is likely that a desired output cannot be performed because of an error in operation content.

SUMMARY OF THE INVENTION

The present invention has been devised in view of the above-mentioned circumstances and an object of the present invention is to provide an image forming apparatus, an image formation management apparatus, and a computer-readable recording medium having stored therein an image formation control program.

To achieve at least one of the above-mentioned objects, an image forming apparatus reflecting one aspect of the present invention includes: an image forming unit that outputs an image to a transfer medium on the basis of a job; and a control unit that controls the image forming unit, the control unit is capable of outputting all sheets and outputting designated sheets of the transfer medium in outputting the job and, when outputting the designated sheets, changes output control content according to whether the designated sheets are output as sheets for replacement media.

In the above-mentioned image forming apparatus, it is preferred that, when outputting the designated sheets as the sheets for the replacement media, the control unit selects, according to content of all sheet output time sheet information, whether the output control content is set as output control content same as output control content other than output control content of the sheets for the replacement media or set as output control content different from the output control content other than the output control content of the sheets for the replacement media.

In the above-mentioned image forming apparatus, it is preferred that, when outputting the designated sheets as the replacement media, the control unit selects, according to the content of the all sheet output time sheet information, whether the output of the designated sheets is an output based on the all sheet output time sheet information or an output with the all sheet output time sheet information temporarily released.

In the above-mentioned image forming apparatus, it is preferred that, in the output with the all sheet output time sheet information temporarily released, the control unit performs the output according to sheet information during the output of the designated sheets.

In the above-mentioned image forming apparatus, it is preferred that, when outputting the designated sheets other than the sheets for the replacement media, the control unit outputs the designated sheets according to the all sheet output time sheet information.

In the above-mentioned image forming apparatus, it is preferred that the all sheet output time sheet information includes a binding processing mode.

In the above-mentioned image forming apparatus, it is preferred that, when outputting the designated sheets as the replacement media, if the all sheet output time sheet information includes the binding processing mode, the control unit temporarily releases the binding processing mode and performs the output.

In the above-mentioned image forming apparatus, it is preferred that, when the binding processing mode is a binding processing of a subset and the designated sheets are output as the sheets for the replacement media, the control unit does not release the binding processing mode and outputs the designated sheets when a sheet range coinciding with a range of the binding processing of the subset is designated.

In the above-mentioned image forming apparatus, it is preferred that the all sheet output time sheet information includes a page stamp.

In the above-mentioned image forming apparatus, it is preferred that, when outputting the designated sheets as the sheets for the replacement media, the control unit controls the job with the page stamp for giving a page number in a sheet unit of the all sheet output time sheet information.

In the above-mentioned image forming apparatus, it is preferred that, when an inner offset during a booklet mode is set in the all sheet output time sheet information, if the designated sheets are output as the sheets for the replacement media, the control unit controls the job with an inner offset value in a sheet unit in the all sheet output time sheet information.

In the above-mentioned image forming apparatus, it is preferred that the control unit is capable of setting whether the designated sheets are output for replacement.

In the above-mentioned image forming apparatus, it is preferred that, when an output method is an output in a wait/proof mode, the control unit excludes, from an operation target, items other than a set number of prints in a job mode displayed on a display unit for check of the job.

In the above-mentioned image forming apparatus, it is preferred that, when an unnecessary tab paper discharge mode is set, in outputting the designated sheets as the sheets for the replacement media, the control unit controls, as an unnecessary tab medium, an index medium outside a designated sheet range in addition to a calculation method for an unnecessary tab during the all sheet output.

In the above-mentioned image forming apparatus, it is preferred that, when the designated sheets are output as the sheets for the replacement media, the control unit discharges the replacement medium to a paper discharge destination different from a normal output destination.

In the above-mentioned image forming apparatus, it is preferred that the control unit sets, according to an instruction from outside the image forming apparatus, whether the output of all the sheets or the output of the designated sheets is performed.

In the above-mentioned image forming apparatus, it is preferred that the control unit outputs the designated sheets as the replacement media according to the instruction from outside the image forming apparatus.

To achieve at least one of the above-mentioned objects, an image formation management apparatus reflecting one aspect of the present invention manages an image forming apparatus that outputs an image to a transfer medium on the basis of a job, the image formation management apparatus comprises a management control unit that controls the image forming apparatus, the management control unit is capable of instructing the image forming apparatus to execute an output of all sheets and an output of designated sheets of the transfer medium, and, when instructing the output of the designated sheets, changes instruction content of output control according to whether the designated sheets are output as sheets for replacement media.

To achieve at least one of the abovementioned objects, a computer-readable recording medium having stored therein an image formation control program reflecting one aspect of the present invention executes by a control unit that performs control of an image forming apparatus that outputs an image onto a transfer medium on the basis of a job, the image formation control program including: selecting an output of all sheets and an output of designated sheets of the transfer medium as an output of the job in the image forming apparatus; and performing, when outputting the designated sheets, control with output control content changed according to whether designated sheets are output as sheets for replacement media.

In the computer-readable recording medium, it is preferred that further includes selecting, when the designated sheets are output as the sheets for the replacement media, according to content of all sheet output time sheet information, whether an output based on the all sheet output time sheet information is performed or an output with the all sheet output time sheet information temporarily released is performed.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE PREFERRED EMBODIMENTS

An embodiment of the present invention is explained below with reference to the accompanying drawings.

Figure 1:
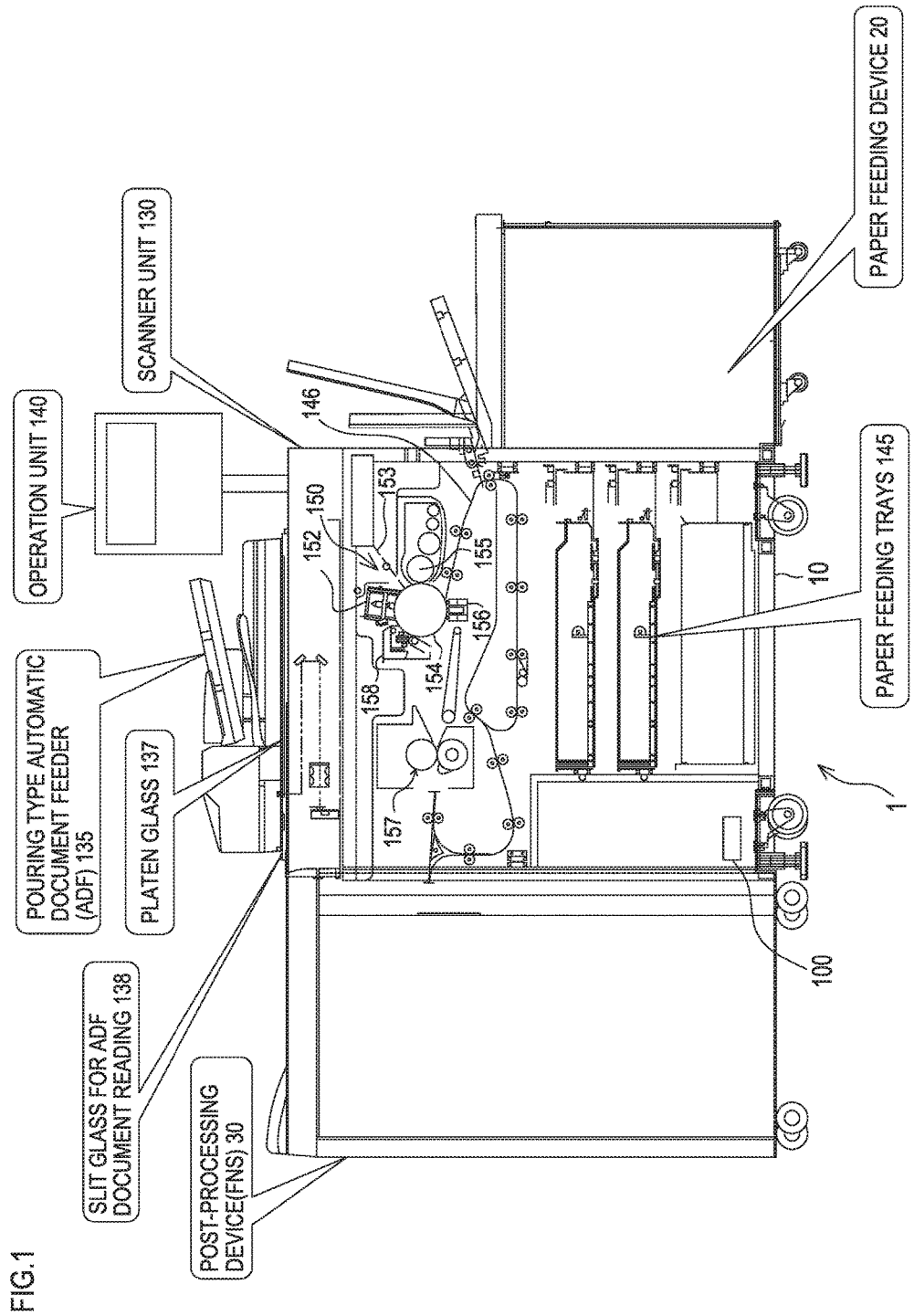
FIG. 1 is a diagram showing a schematic mechanical configuration of an image forming apparatus in an embodiment of the present invention.

FIG. 1 is a center sectional view of an entire image forming apparatus 1 and shows a mechanical configuration. The configuration is explained below.

In the image forming apparatus 1, a paper feeding device 20 is connected to a pre-stage side of an apparatus main body 10 and a post-processing device (an FNS) 30 is connected to a post-stage side of the apparatus main body 10. In the image forming apparatus 1, conveyance of a sheet is possible between the devices and the devices are capable of communicating with each other. The sheet is correspond to the transfer medium. Note that, in the present invention, besides the sheet, cloth or the like can be used as the transfer medium.

Note that the image forming apparatus 1 does not have to include the post-processing device (the FNS) 30. An image forming apparatus can be configured in a configuration not including the paper feeding device 20 in the apparatus main body 10 or can include the paper feeding device 20.

In the apparatus main body 10, a scanner unit 130 (FIG. 2) including a CCD and a circulation type automatic document feeder (ADF) 135 are provided on an upper side of the apparatus main body 10. Image reading of an original is possible through a platen glass 137 or a slit glass for ADF document reading 138.

An image reading unit is configured by the scanner unit 130, the pouring type automatic document feeder (ADF) 135, the platen glass 137, the slit glass for ADF document reading 138, and the like.

An operation unit 140 consisting of a touch panel is provided in a part where the platen glass 137 is not located on the upper side of the apparatus main body 10 to enable operation by an operator and display of information. The operation unit 140 configures an operation unit and is used as the display unit of the invention as well. Note that, as the present invention, the operation unit and the display unit can also be configured separately. The operation unit 140 can be other than a touch panel.

A plurality of paper feeding trays 145 (in the figure, three stages) are disposed on the lower side of the apparatus main body 10. Further, the paper feeding device 20 including a paper feeding tray is disposed to be annexed to the apparatus main body 10.

In the apparatus main body 10, a conveyance path 146 for conveying sheets fed from the paper feeding trays 145 and the paper feeding device 20 is provided. An image forming unit 150 configured by a charging device 152, an LD 153, a photosensitive body 154, a developing device 155, a transfer unit 156, a fixing device 157, a cleaning device 158, and the like is provided halfway in the conveyance path 146 in the apparatus main body 10. In the paper feeding device 20, a conveyance path (not shown in the figure) for conveying the respectively fed sheets and introducing the sheets into the apparatus main body 10 is provided. Further, the post-processing device (the FNS) 30 conveys a sheet having an image printed thereon and discharges the sheet without performing post processing or after performing the post processing.

In the image forming unit 150, the charging device 152, the developing device 155, and the transfer unit 156 are disposed around the photosensitive body 154. The photosensitive body 154 is correspond to the image bearing body. The charging device 152 uniformly charges the surface of the photosensitive body 154 before image writing. The LD 153 radiates a semiconductor laser on the photosensitive body 154, the surface of which is uniformly charged, to thereby form an electrostatic latent image on the photosensitive body 154. The developing device 155 develops, with a toner material, the electrostatic latent image formed on the photosensitive body 154 by the LD 153.

A toner image is formed on the photosensitive body 154 by development processing. The transfer unit 156 transfers the toner image on the photosensitive body 154 onto a sheet conveyed from the paper feeding trays 145 or the paper feeding device 20. The sheet having the toner image transferred thereon is separated from the photosensitive body 154 and conveyed to the fixing device 157. The toner material remaining on the photosensitive body 154 is removed by the cleaning device 158.

The fixing device 157 heats the conveyed sheet to thereby fix the toner image transferred on the front surface side of the sheet. The sheet applied with fixing processing is directly conveyed to the post-processing device (the FNS) 30 located on a side of the apparatus main body 10 in the case of simplex printing.

The post-processing device (the FNS) 30 performs post-processing such as stapling, punching, saddle folding, or the like as desired.

On the other hand, in the case of duplex printing, the sheet after the fixing is switched back. A predetermined image is transferred onto the rear surface side of the sheet by the image forming unit 150. The sheet having the images formed on both surfaces is conveyed to the post-processing device (the FNS) 30 after the fixing.

The apparatus main body 10 includes a control unit 100 that controls the apparatus main body 10. The control unit 100 includes a CPU and a computer program executed on the CPU. The control unit 100 further includes a storing unit that stores computer programs, operation parameters, an operation record of the image forming apparatus, and the like. The control unit 100 can control the paper feeding device 20 and the post-processing device (the FNS) 30.

A basic operation of the image forming apparatus 1 is explained.

First, a procedure for accumulating image data in the apparatus main body 10 is explained. In the apparatus main body 10, image forming apparatus 1 reads, in the scanner unit 130, an image and generates image data. The image forming apparatus 1 optically reads an image from an original in the scanner unit 130. In this case, the scanner unit 130 receives a command from the control unit 100. The image forming apparatus 1 can perform the reading of the original while automatically feeding the original with the pouring type automatic document feeder (ADF) 135 or placing the original on the platen glass 137.

The control unit 100 issues the command to the scanner unit 130 on the basis of operation (a reading instruction or a copy instruction) by the operation unit 140. The image read by the scanner unit 130 is subjected to data processing. Image data subjected to the data processing is stored in a storing unit.

Besides, the image data is sometimes input to the apparatus main body 10 via a network. Examples of the image data include image data generated by an application program or the like of an external apparatus or the like. A method of generating image data is not particularly limited.

When an image output is performed in the image forming apparatus 1, that is, when the image forming apparatus 1 is used as a copying machine or a printer, the photosensitive body 154 is charged by the charging device 152. The image data stored in the storing unit is written in the photosensitive body 154 by the LD 153 of the image forming unit 150.

In the image forming unit 150, a latent image written on the photosensitive body 154 is developed as a toner image by the developing device 155. The toner image is transferred onto a sheet supplied by the conveyance path 146 in the transfer unit 156 and is fixed in the fixing device 157. In the photosensitive body 154, after the toner image is transferred onto the sheet, residual toner is removed by the cleaning device 158.

Note that this embodiment is explained on the premise that monochrome image formation is performed. However, the image forming apparatus 1 can bean image forming apparatus including photosensitive bodies (the image bearing bodies) and intermediate transfer units (image bearing bodies) for respective colors (e.g., cyan, magenta, yellow, and black).

The sheet subjected to the image formation is sent to the post-processing device (the FNS) 30 and is subjected to predetermined post-processing in the post-processing device (the FNS) 30 according to post-processing setting. When the post-processing is not performed, the sheet is directly discharged in the post-processing device (the FNS) 30.

Figure 2:
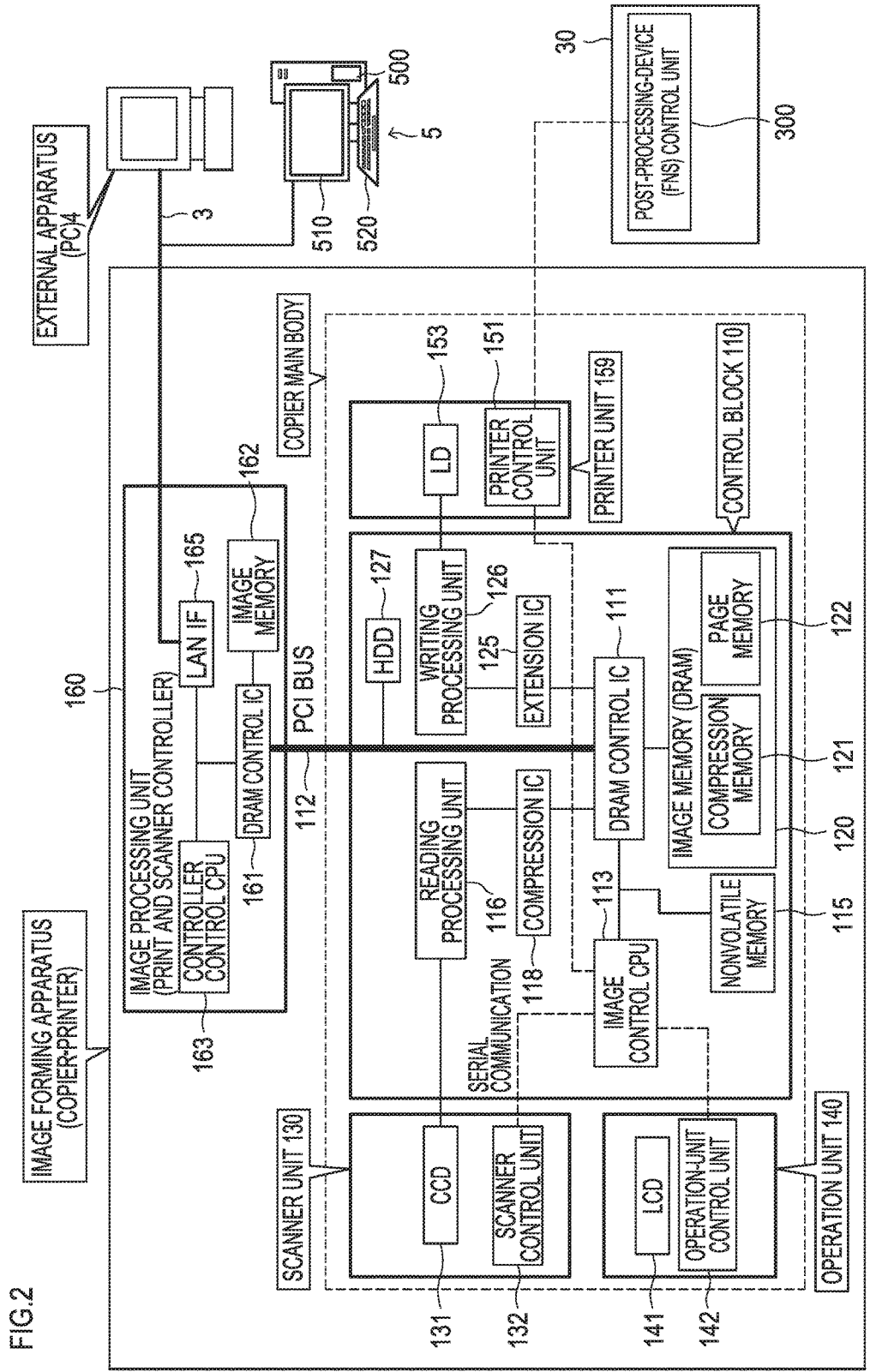
FIG. 2 is a diagram showing a functional block of an image forming system in the embodiment.

Functions of an image forming system including the image forming apparatus 1 are explained with reference to a block diagram of FIG. 2.

The image forming apparatus 1 includes, as main components, a copier main body including a control block 110, the scanner unit 130, the operation unit 140, and a printer unit 159 and an image processing unit (a print and scanner controller) 160 that processes image data input and output between an external apparatus (a PC) 4 and a management apparatus 5 through a network 3.

The control block 110 includes a PCI bus 112. The PCI bus 112 is connected to a DRAM control IC 111 in the control block 110. A HDD 127 is connected to the PCI bus 112. For example, image data can be stored in the HDD 127.

Further, the control block 110 includes an image control CPU 113. The DRAM control IC 111 is connected to the image control CPU 113. A nonvolatile memory 115 is connected to the image control CPU 113. A computer program for operating the image control CPU 113, setting data of the image forming apparatus 1, process control parameters, and the like are stored in the nonvolatile memory 115.

The image control CPU 113 controls the entire image forming apparatus 1 and grasps a state of the entire image forming apparatus 1. The image control CPU 113 performs management of a job, conveyance control of a sheet, image formation control, communication control, and the like. The image control CPU 113 functions as the control unit 100 and is correspond to the control unit of the present invention. In the image control CPU 113, the control is executed according to the operation of a computer program. The computer program is correspond to the image formation control program of the present invention. The computer program can be stored in a storage medium, carried, and introduced into the image forming apparatus.

The scanner unit 130 includes a CCD 131 that performs optical reading and a scanner control unit 132 that performs control of the entire scanner unit 130. The scanner control unit 132 is connected to the image control CPU 113 to be capable of performing serial communication. The scanner control unit 132 is controlled by the image control CPU 113. Note that the scanner control unit 132 can be configured by a CPU, a computer program for operating the CPU, and the like. Image data read by the CCD 131 is subjected to data processing in a reading processing unit 116.

The operation unit 140 includes an LCD 141 of a touch panel type and an operation-unit control unit 142. The LCD 141 and the operation-unit control unit 142 are connected. The operation-unit control unit 142 and the image control CPU 113 are connected to be capable of performing serial communication. With this configuration, control of the operation unit 140 is performed by the image control CPU 113. Note that the operation-unit control unit 142 can be configured by a CPU, a computer program for operating the CPU, and the like.

In the operation unit 140, setting in the image forming apparatus 1 and an input of operation control conditions such as an operation command are possible. Further, for example, display of setting content, a machine state, and information is possible. The operation unit 140 is controlled by the image control CPU 113. Predetermined operation and the like can be performed by the operation unit 140. For example, it is possible to set whether an entire job is output or designated sheets are output. Further, when the designated sheets are output, it is possible to set whether the sheets are used for replacement. When the designated sheets are output as sheets for replacement media, it can be able to be set whether the cooperation unit 140 is controlled by control content different from control content at the time when the designated sheets are not output as the sheets for the replacement media. It can be set according to initial setting whether the operation unit 140 is controlled by the different control content.

The DRAM control IC 111 is connected to an image memory (a DRAM) 120 including a compression memory 121 and a page memory 122. Image data acquired by the scanner unit 130 and image data acquired through the network 3 are stored in the image memory (the DRAM) 120 as job data. As explained above, the image memory (the DRAM) 120 is a storage region of image data. The image memory (the DRAM) 120 stores image data of a job to be printed. The DRAM control IC 111 can cause the image memory (the DRAM) 120 to store image data concerning a plurality of jobs. That is, image data of a reserved job can also be stored in the image memory (the DRAM) 120. Job data including image data can be stored in the HDD 127 as well.

A compression IC 118 that compresses image data and an extension IC 125 that extends compressed image data are connected to the DRAM control IC 111. A writing processing unit 126 is connected to the extension IC 125. The writing processing unit 126 is connected to the LD 153 of the printer unit 159 and performs processing of data used for the operation of the LD 153. The LD 153 is a general term of LDs for respective colors. The printer unit 159 controls a conveying unit including the image forming unit 150 and the conveyance path 146.

The printer unit 159 includes a printer control unit 151 that controls the entire printer unit 159. The printer control unit 151 is connected to the image control CPU 113 and controlled by the image control CPU 113. That is, the printer control unit 151 performs start/stop of print operation according to parameters given from the image control CPU 113. A post-processing-device control unit 300 provided in the post-processing device (the FNS) 30 is controllably connected to the printer control unit 151. The post-processing-device control unit 300 can control the post-processing via the printer control unit 151 according to a command of the image control CPU 113.

A DRAM control IC 161 of the image processing unit (the print and scanner controller) 160 is connected to the PCI bus 112 connected to the DRAM control IC 111. In the image processing unit (the print and scanner controller) 160, an image memory 162 is connected to the DRAM control IC 161. In the image processing unit (the print and scanner controller) 160, a controller control CPU 163 is connected to the DRAM control IC 161. A LAN interface 165 is connected to the DRAM control IC 161. The LAN interface 165 is connected to the network 3.

The external apparatus (the PC) 4, the management apparatus 5, and the like are connected to the network 3. It is possible to perform transmission and reception of image data to and from the image forming apparatus 1 via the LAN interface 165 and perform transmission and reception of management data by the management apparatus 5.

The management apparatus 5 can perform management of the image forming apparatus 1 and functions as an image formation management apparatus. The management apparatus 5 includes a management control unit 500, a management-apparatus display unit 510, and a management-apparatus operation unit 520. The display unit and the operation unit can be shared by a touch panel or the like. The management control unit 500 can be configured by a CPU, a computer program executed on the CPU, and the like. The LAN interface 165 is correspond to the communication unit. The communication unit makes it possible to perform communication between the external apparatus and the image forming apparatus 1.

A basic operation of the image forming apparatus 1 is explained.

First, a procedure for accumulating image data in the image forming apparatus 1 is explained. When the image forming apparatus 1 reads an image of an original in the scanner unit 130 and generates image data, the image forming apparatus 1 optically reads, in the scanner unit 130, the image of the original using the CCD 131. In this case, the image forming apparatus 1 performs operation control of the CCD 131 with the scanner control unit 132 that receives a command from the image control CPU 113. The image read by the CCD 131 is subjected to data processing by the reading processing unit 116. Image data subjected to the data processing is compressed by a predetermined method in the compression IC 118 and stored in the compression memory 121 and the HDD 127 via the DRAM control IC 111. The image data stored in the compression memory 121 and the HDD 127 can be managed by the image control CPU 113 as a job. In the management of the job, the job can be saved as a reserved job.

When image data is acquired from the outside, for example, image data transmitted from the external apparatus (the PC) 4 is stored in the image memory 162 by the DRAM control IC 161 via the LAN interface 165 controlled by the controller control CPU 163. The data of the image memory 162 is once stored in the page memory 122 via the DRAM control IC 161, the PCI bus 112, and the DRAM control IC 111. The data stored in the page memory 122 is sequentially sent to the compression IC 118 via the DRAM control IC 111 and subjected to compression processing, stored in the compression memory 121 and the HDD 127 via the DRAM control IC 111, and managed by the image control CPU 113 in the same manner as explained above.

When the image forming apparatus 1 performs an image output, that is, when the image forming apparatus 1 is used as a copying machine or a printer, the image forming apparatus 1 sends the image data stored in the compression memory 121 and the HDD 127 to the extension IC 125 via the DRAM control IC 111, develops the image data, and repeatedly develops the image data in the LD 153 in the writing processing unit 126 to print the image data on a sheet.

When the image forming apparatus 1 is used as a copying machine, the image forming apparatus 1 notifies information concerning printing conditions (a print mode) and the like set on the operation unit 140 and creates setting information in the image control CPU 113. The created setting information can be stored in the RAM in the image control CPU 113.

When the image forming apparatus 1 is used as a printer, printing conditions are set by a printer driver in the external apparatus (the PC) 4. Like the image, the set printing conditions are stored in the external apparatus (the PC) 4, the LAN IF 165, the image memory 162, the DRAM control IC 161 (the controller), the DRAM control IC 111 (the main body), and the page memory 122 in this order.

In the printer unit 159, control of the units is performed by the printer control unit 151 that receives a command of the image control CPU 113. In the image forming unit 150, after toner images written in the photosensitive bodies 154 are transferred onto an intermediate transfer belt, the toner images are transferred onto a sheet supplied by the paper feeding device 20 or the paper feeding trays 145 and fixed on the sheet. The sheet subjected to image formation is conveyed to the post-processing device (the FNS) 30 on the downstream side and subjected to post-processing according to necessity.

Further, the management apparatus 5 that can perform management of an image forming apparatus connected to a network is connected to the image forming apparatus 1. The management apparatus 5 includes the management control unit 500 and can control the image forming apparatus 1 according to the operation of the management control unit 500.

The management control unit 500 can be configured by a CPU, a computer program for operating the CPU, a storing unit, and the like. Further, the management apparatus 5 includes the management-apparatus display unit 510 and the management-apparatus operation unit 520 as explained above.

The management control unit 500 can perform image formation control on the image forming apparatus 1. The management control unit 500 can be able to instruct the image forming apparatus 1 to execute an output of all sheets and an output of designated sheets or can perform an instruction for outputting designated sheets as sheets for replacement media. Further, when instructing an output of the designated sheets, the management control unit 500 can be able to change instruction content according to whether the designated sheets are output as sheets for replacement media. The management control unit 500 is correspond to the control unit in the present invention. A computer program executed when the image forming apparatus is managed by the management control unit 500 is correspond to the image formation control program of the present invention. The management apparatus 5 can be configured by a management sever, a computer, a terminal apparatus, a cellular phone, a smartphone, or the like. The management apparatus 5 can transmit job data to the image forming apparatus 1 together with the instructions or can perform only the instruction.

A procedure for outputting a job is explained.

Figure 3:
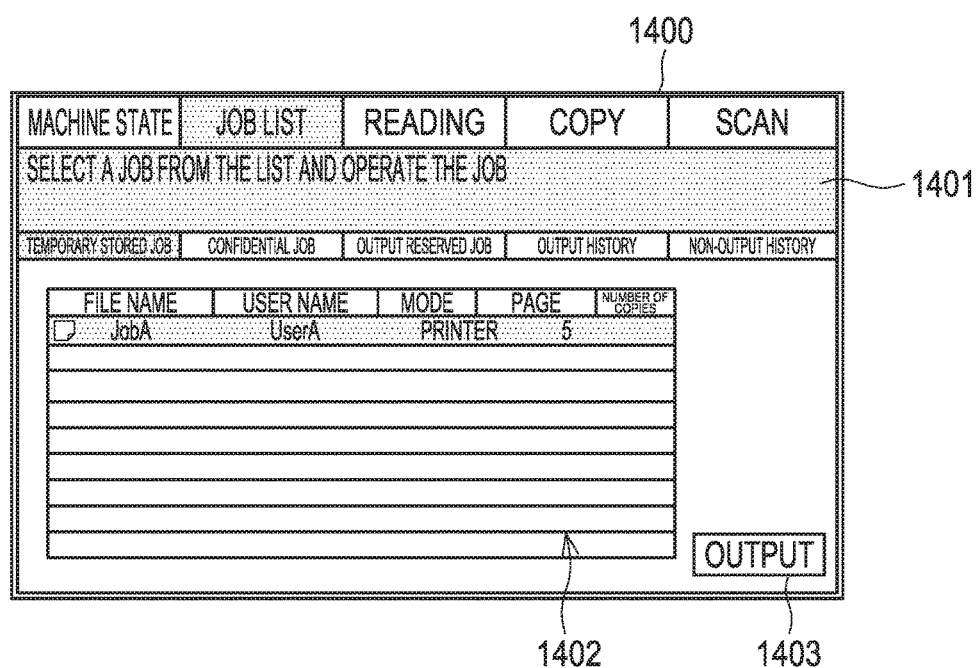
FIG. 3 is a diagram showing an example of an operation screen during a job output in the embodiment.

FIG. 3 shows an operation screen 1400 displayed on the operation unit 140. In the screen, a temporarily saved job list 1402 of temporarily saved jobs is displayed on a job list screen 1401.

In the temporarily saved job list 1402, jobs temporarily saved in the HDD 127 and the like are displayed. The image forming apparatus 1 can receive job data from an apparatus outside the image forming apparatus 1 and display a job list or receive job list data from the apparatus outside the image forming apparatus 1. Further, the image forming apparatus 1 can display job data of the image forming apparatus 1 and job data outside the image forming apparatus 1 together as a job list.

An output button 1403 is displayed to be capable of being pressed on the job list screen 1401.

In this example, a job A is displayed. When the user presses a display region of the job A to select the job A and presses the output button 1403, the job A is selected and an output method selection screen 1410 shown in FIG. 4 is pop-up displayed.

Figure 4:
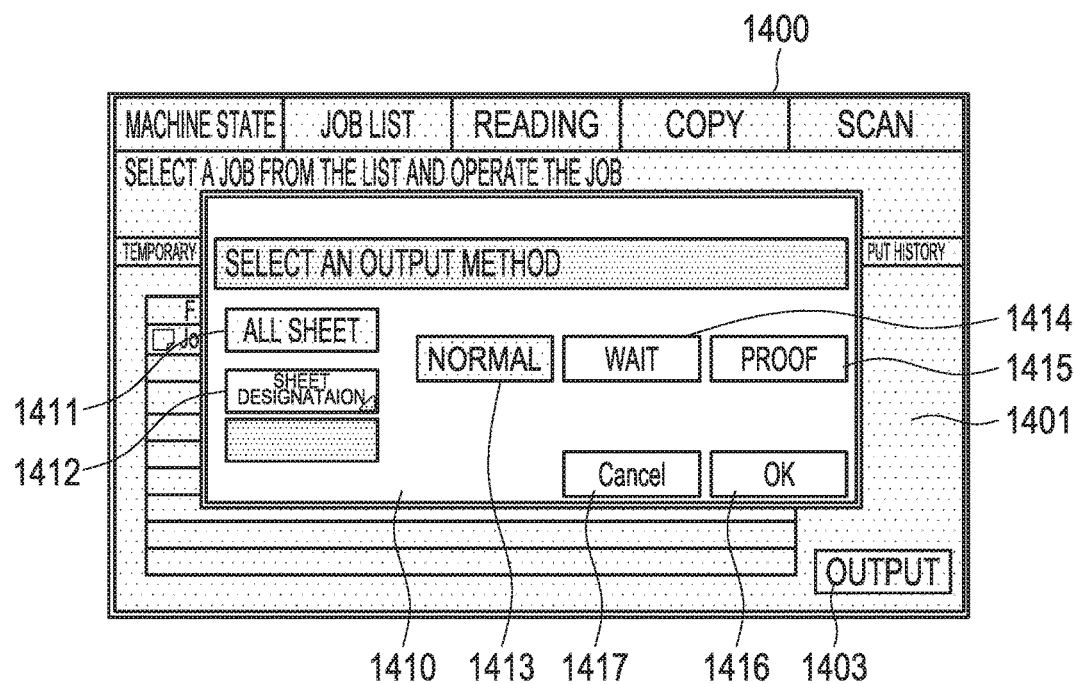
FIG. 4 is a diagram showing a job output method selection screen during the job output in the embodiment.

FIG. 4 shows the output method selection screen 1410 pop-up displayed on the operation screen 1400 when an output of a job is operated.

On the output method selection screen 1410, an all sheet button 1411 and a sheet designation button 1412 are displayed to be capable of being pressed. One of the buttons can be selected and pressed. Further, on the output method selection screen 1410, a normal button 1413, a wait button 1414, and a proof button 1415 are displayed to be capable of respectively being pressed. One of the buttons can be alternatively selected and pressed.

On the output method selection screen 1410, an OK button 1416 and a cancel button 1417 are displayed to be capable of being pressed. When the OK button 1416 is pressed in a state in which the all sheet button 1411 is selected and the normal button 1413 is selected, printing is started.

Figure 5:
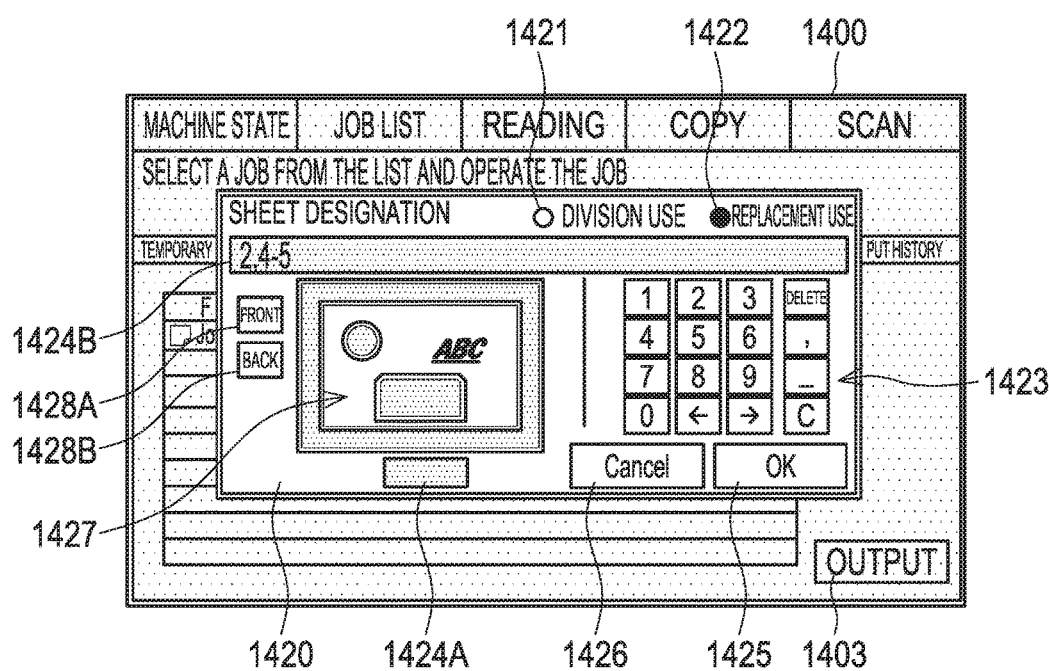
FIG. 5 is a diagram showing a sheet designation operation screen during the job output in the embodiment.

When the OK button 1416 is pressed without designating sheets in a state in which the sheet designation button 1412 is selected, a sheet designation operation screen 1420 shown in FIG. 5 is pop-up displayed.

On the other hand, when the cancel button 1417 is pressed, input operation content is cancelled.

On the operation screen 1400 shown in FIG. 4, a state is shown in which the all sheet button 1411 and the normal button 1413 are selected and pressed.

FIG. 5 shows the sheet designation operation screen 1420 pop-up displayed on the operation screen 1400.

On the sheet designation operation screen 1420, a division use radio button 1421 and a replacement use radio button 1422 are displayed to be capable of being alternatively selected. One of the radio buttons can be set to be selected in default.

On the sheet designation operation screen 1420, an input section 1424A is provided on the lower side of the screen. In order to perform an input to the input section 1424A, a ten key button group 1423 including arrow keys and a comma button is displayed to be capable of being pressed. The sheet designation operation screen 1420 includes an input display section 1424B for displaying an input result of the ten key button group 1423. This figure indicates that pages 2 and 4 to 5 are designated in the input display section 1424B.

On the sheet designation operation screen 1420, an OK button 1425 and a cancel button 1426 are displayed to be capable of being pressed.

Further, on the sheet designation operation screen 1420, a preview section 1427 is provided on the lower side of the input display section 1424B. A front button 1428A and a rear button 1428B are displayed on the left side of the preview section 1427 to be capable of being pressed.

The user can input, referring to the preview section 1427 shown in FIG. 5, a sheet that the user desires to print.

In an example shown in FIG. 5, a front surface of a second sheet is displayed on the preview section 1427 by inputting "2" to a text box under a preview screen.

When the rear button 1428B is pressed, a rear surface of the second sheet is displayed. When the front button 1428A is pressed, the front surface of the second sheet is displayed. In default, the front surface is set.

When there are sheets desired to be replaced, it is possible to operate the ten key button group 1423 and designate the sheets.

In the example shown in FIG. 5, by inputting "2, 4-5", three sheets in total, that is, a second sheet, a fourth sheet, and a fifth sheet are output.

Figure 6:
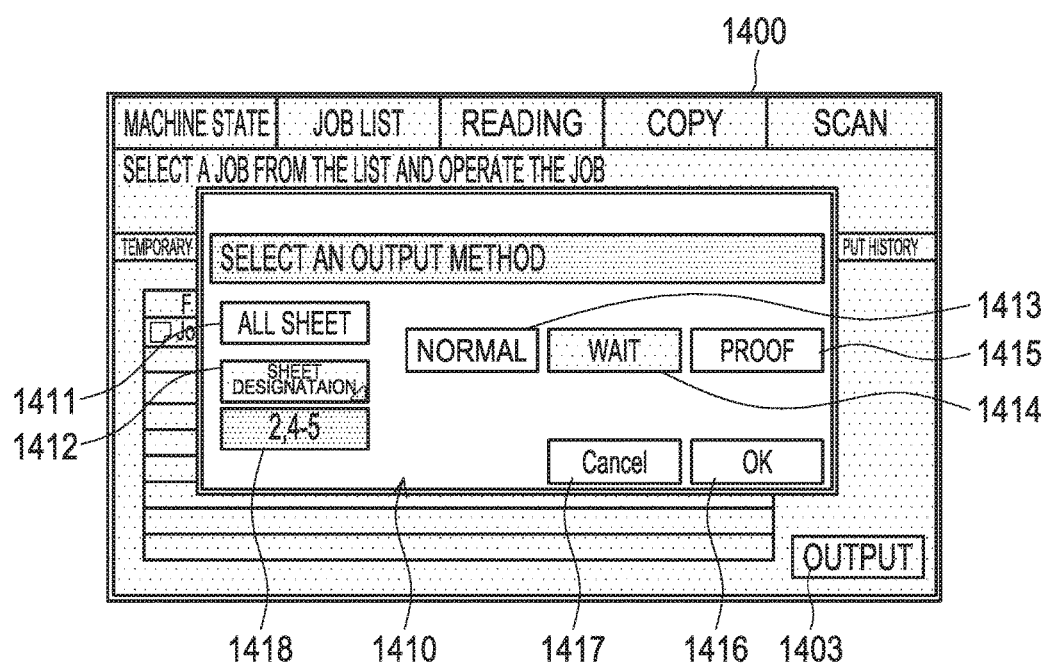
FIG. 6 is a diagram showing the job output method selection screen on which sheets are designated during the job output in the embodiment.

After the sheet designation input is completed, when the user presses the OK button 1425, the output method selection screen 1410 shown in FIG. 6 is pop-up displayed. When the cancel button 1426 is pressed, input content is cancelled.

FIG. 6 shows the output method selection screen 1410 pop-up displayed on the operation screen 1400 when sheets are designated. A designated-sheet display section 1418 is provided on the lower side of the sheet designation button 1412. Numbers of designated sheets are displayed. The other display is the same as the display shown in FIG. 4.

When the OK button 1416 is pressed in a state in which sheets are designated and the normal button 1413 is selected, the designated sheets, in this example, second, fourth, and fifth sheets are printed.

When the OK button 1416 is pressed in a state in which sheets are designated and the wait button 1414 or the proof button 1415 is selected, the operation screen 1400 shifts to a job ticket editing screen.

In this case, when the wait button 1414 is selected, the job ticket editing screen is displayed. After a job mode is checked, the designated sheets are printed.

When the proof button is selected, the job ticket editing screen is displayed. Parts of the designated sheets are simultaneously printed. After checking a job mode and an output result, the designated sheets are printed.

Figure 7:
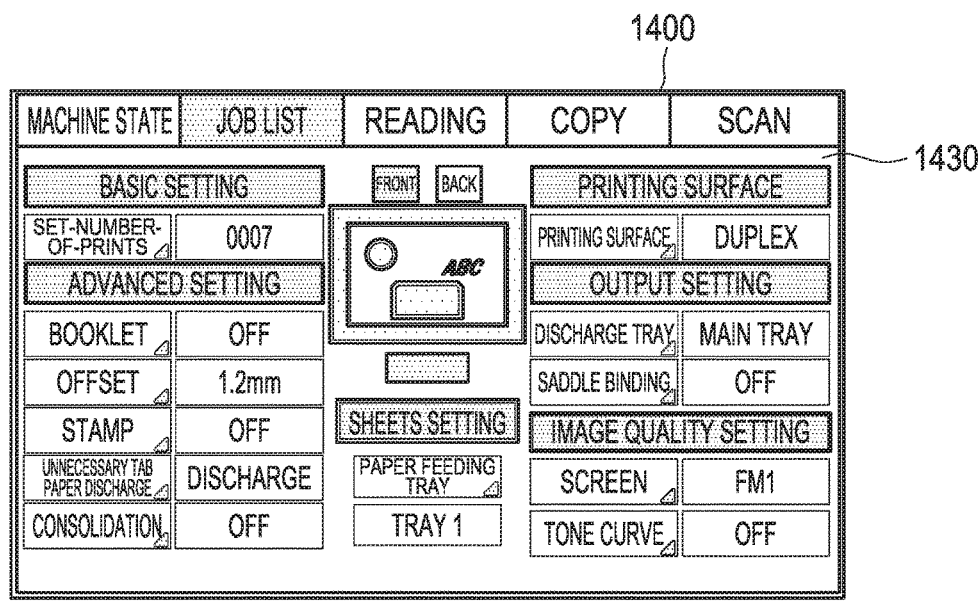
FIG. 7 is a diagram showing a job ticket editing screen in the embodiment.
Figure 8:
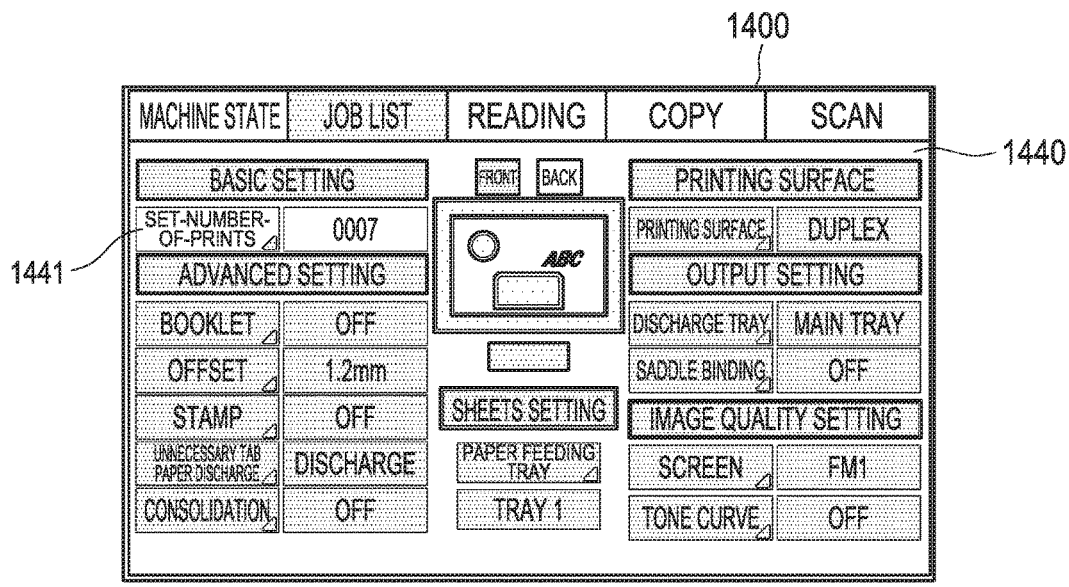
FIG. 8 is a diagram showing the job ticket editing screen on which setting items are limited in the embodiment.

FIGS. 7 and 8 show the job ticket editing screen.

A job ticket editing screen 1430 shown in FIG. 7 is displayed when the division use radio button 1421 is pressed on the sheet designation operation screen 1420 shown in FIG. 5. On the job ticket editing screen 1430, all settings can be operated. The user finally checks the job mode on the job ticket editing screen 1430 and presses a start hardware key to start printing. The job mode is correspond to the all page output time sheet information.

On the other hand, a job ticket editing screen 1440 shown in FIG. 8 is displayed when the replacement use radio button 1422 is pressed on the sheet designation operation screen 1420 shown in FIG. 5. On the job ticket editing screen 1440, although the number of prints can be input in a set-number-of-prints input section 1441, sections other than the set-number-of-prints input section 1441 cannot be operated and grayed out.

A procedure for performing an output by designated sheets is explained with reference to a flowchart of FIG. 9. The following procedure is executed according to control of the control unit. The control unit executes the image formation control program of the present invention.

Figure 9:
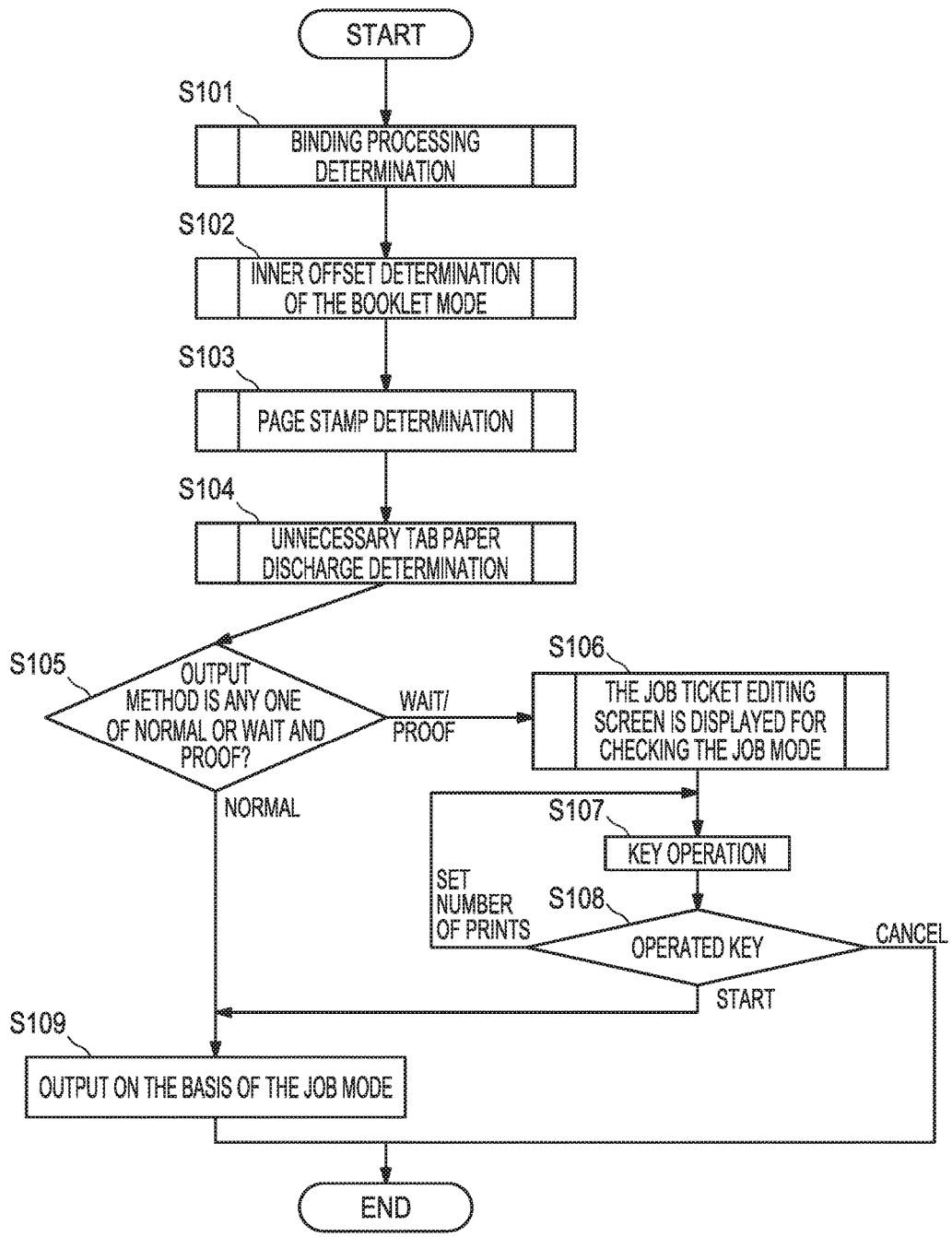
FIG. 9 is a flowchart for explaining a procedure for outputting designated sheets in the embodiment.

On the output method selection screen 1410, when the user presses the OK button 1416 in a state in which the normal button 1413 is selected, a main flow of the flowchart of FIG. 9 is started.

When the flow is started, first, the control unit performs binding processing determination (step S101). Details of the binding processing determination are explained with reference to flowchart of FIG. 10.

Subsequently, the control unit performs inner offset determination of the booklet mode (step S102). Details of inner offset determination of the booklet mode are explained in a flowchart of FIG. 11.

Subsequently, the control unit performs page stamp determination (step S103). Details of the page stamp determination are explained in a flowchart of FIG. 12.

Subsequently, the control unit performs unnecessary tab paper discharge determination (step S104). Details of the unnecessary tab paper discharge determination are explained in a flowchart of FIG. 13.

In the main flow of this embodiment, the control unit determines whether an output method is any one of normal, wait, and proof (step S105).

When the output method is the normal (normal in step S105), the control unit performs an output on the basis of the job mode (step S109) and thereafter ends the procedure.

When the output method is the wait or the proof (step S106), the control unit displays the job ticket editing screen shown in FIG. 7 or FIG. 8 for checking the job mode (step S106), changes to a key operation waiting state (step S107), and determines an operated key (step S108). The job ticket includes all page time sheet information.

When the user presses the start hardware key, the control unit determines that key operation is a start key (start in step S108), performs an output on the basis of the job mode (step S109), and thereafter ends the procedure.

When the user presses a set-number-of-prints button, the control unit determines that the key operation is key operation of the set number of prints (set number of prints in step S108). After changing the set number of prints, the control unit returns to S107 and changes to the key operation waiting state again. When the user presses a cancel hardware key, the control unit determines that the key operation is cancel key operation (cancel in step S108) and ends the procedure.

Figure 10:
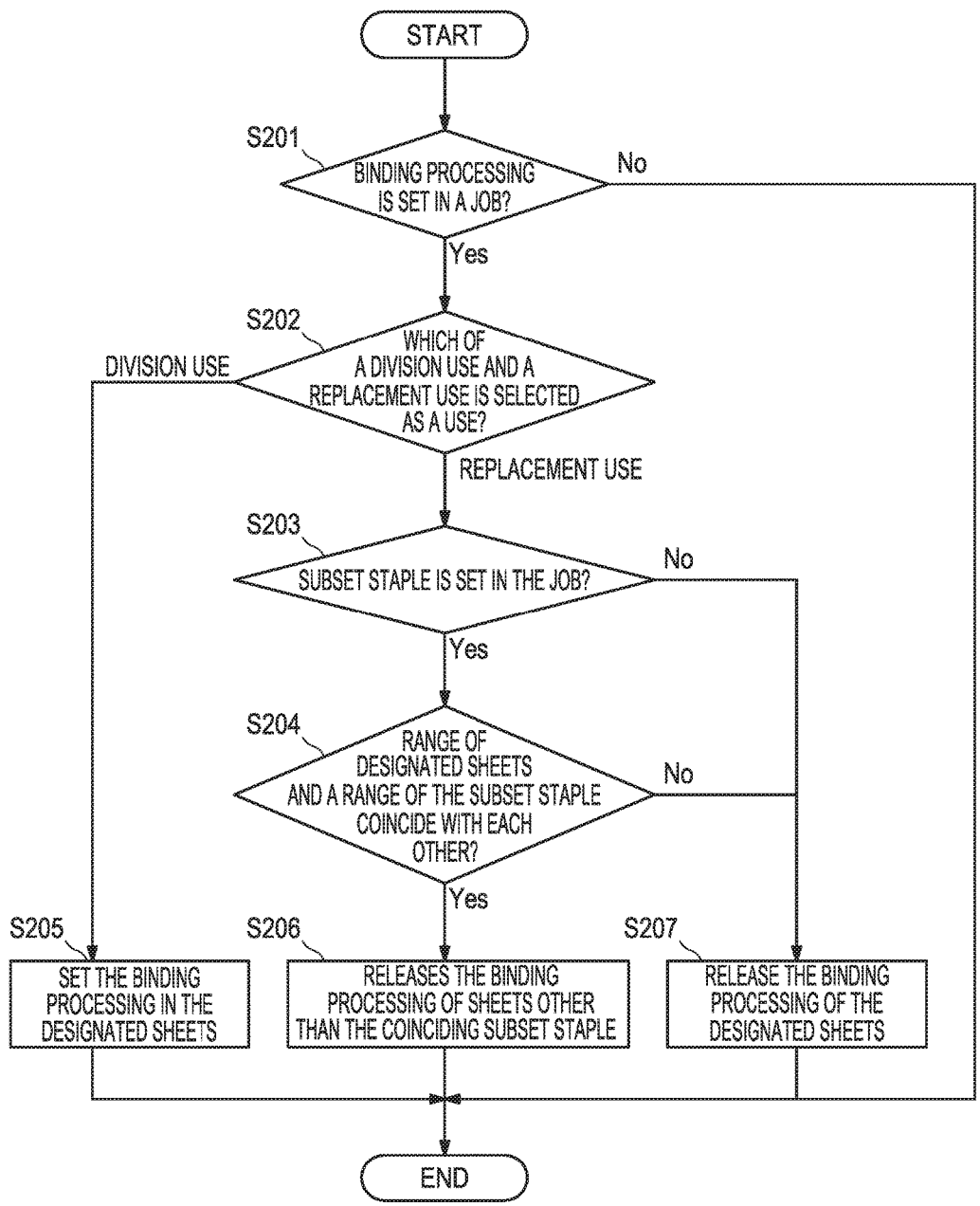
FIG. 10 is a flowchart for explaining a procedure of binding processing determination in the embodiment.

A procedure of binding processing determination is explained with reference to a flowchart of FIG. 10. Note that the procedure explained below is executed by control of the control unit. The control unit executes the image formation control program of the invention.

In this flowchart, the control unit determines, when binding processing is set in the job mode, how the binding processing is set.

First, the control unit determines whether the binding processing is set in a job (step S201). When the binding processing is set (Yes in step S201), the control unit shifts to step S202. When the binding processing is not set (No in step S201), the control unit ends the procedure.

In step S202, the control unit determines which of a division use and a replacement use is selected as a use. When the use is the replacement use (replacement use in step S202), the control unit shifts to step S203. When the use is the division use (division use in step S202), the control unit shifts to step S205.

In step S203, the control unit determines whether a subset staple is set in the job. When the subset staple is set in the job (Yes in step S203), the control unit shifts to step S204.

When the subset staple is not set in the job (No in step S203), the control unit shifts to step S207.

In step S204, the control unit determines whether a range of sheets designated by the user and a range of the subset staple set in the job coincide with each other. When the range of the sheets and the range of the subset staple set in the job coincide with each other (Yes in step S204), the control unit releases the binding processing of sheets other than the coinciding subset staple (step S206). For example, when two subset staples for sheets 1 to 2 and sheets 4 to 5 are set as the subset staple in the job and the user designates sheets as "2, 4-5", the control unit releases the subset staple setting for the 1 to 2 sheets but does not release subset staple setting for the 4 to 5 sheets and outputs the subset staples for the 4 to 5 sheets as the subset staple. Thereafter, the control unit ends the procedure.

When the range of sheets and the range of the subset staple set in the job do not coincide with each other (No in step S204), the control unit releases the binding processing of the sheets on the basis of sheet numbers designated by the user (step S207) and thereafter ends the procedure.

For example, when saddle binding is set in the job and the user designates sheets as "2, 4-5", the control unit sets second, fourth, and fifth sheets to be saddle-bound as one set.

In step S205, the control unit sets the binding processing in the designated sheets and thereafter ends the procedure.

Figure 11:
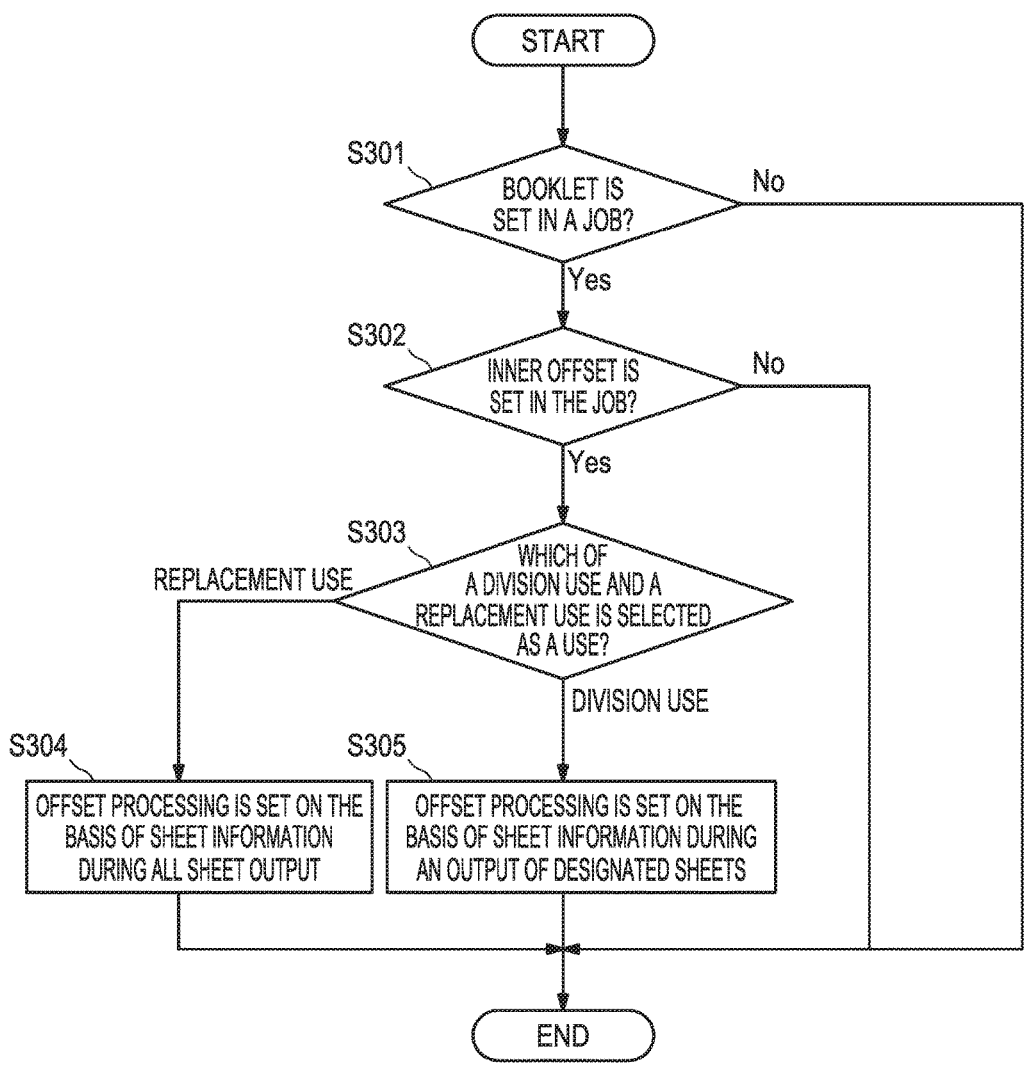
FIG. 11 is a flowchart for explaining a procedure for determining, when a booklet is set as a job mode, how the booklet is set in the embodiment.

In a flowchart shown in FIG. 11, when a booklet is set in the job mode, the control unit determines how the booklet is set. Note that the following procedure is executed by control of the control unit. The control unit executes the image formation control program of the present invention.

First, the control unit determines whether a booklet is set in a job (step S301). When the booklet is set in the job (Yes in step S301), the control unit shifts to step S302. When the booklet is not set in the job (No in step S301), the control unit ends the procedure.

In step S302, the control unit determines whether an inner offset is set in the job. When the inner offset is set in the job (Yes in step S302), the control unit shifts to step S303. When the inner offset is not set in the job (No in step S302), the control unit ends the procedure.

In step S303, the control unit determines which of a division use and a replacement use is selected as a use.

In the case of the replacement use (replacement use in step S303), the control unit shifts to step S304.

In the case of the division use (division use in step S303), the control unit shifts to step S305.

In step S304, the control unit sets offset processing on the basis of sheet information during all sheet output of the job. For example, when one hundred sheets are present as all sheets of the job and the user designates sheets as "2, 4-5", the control unit sets offset values of second, fourth, and fifth sheets respectively at the time when the one hundred sheets are output. Thereafter, the control unit ends the procedure.

In step S305, the control unit sets offset processing on the basis of sheet information during an output of designated sheets. For example, when one hundred sheets are present as all sheets of the job and the user designates sheets as "2, 4-5", the control unit sets offset values of first, second, and third sheets respectively at the time when three sheets are output. Thereafter, the control unit ends the procedure.

Figure 12:
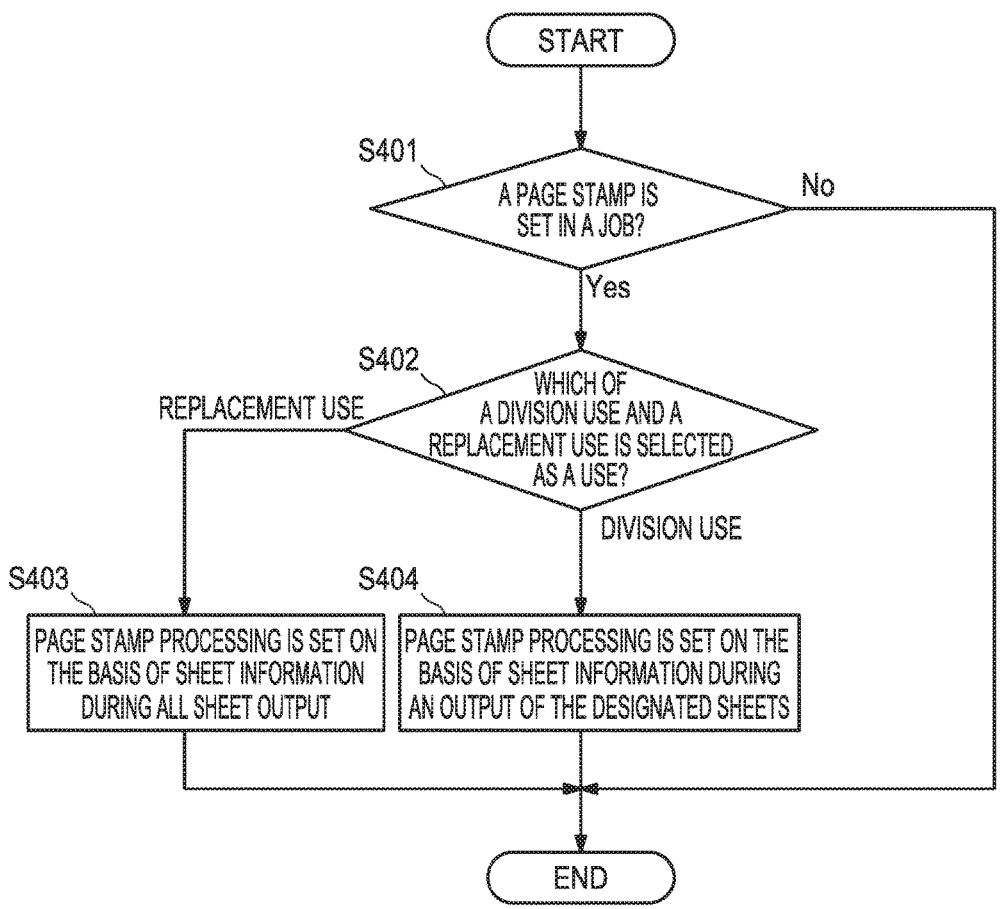
FIG. 12 is a flowchart for explaining a procedure for determining, when a page stamp is set as the job mode, how the page stamp is set in the embodiment.

In a flowchart shown in FIG. 12, when a page stamp is set in the job mode, the control unit determines how the page stamp is set. Note that the following procedure is executed by control of the control unit. The control unit executes the image formation control program of the present invention.

In this flowchart, first, the control unit determines whether a page stamp is set in a job (step S401).

When the page stamp is set in the job (Yes in step S401), the control unit shifts to step S402. When the page stamp is not set in the job (No in step S401), the control unit ends the procedure.

In step S402, the control unit determines which of a division use and a replacement use is selected as a use. In the case of the replacement use (replacement use in step S402), the control unit shifts to step S403.

In the case of the division use (division use in step S402), the control unit shifts to step S404.

In step S403, the control unit sets page stamp processing on the basis of sheet information during all sheet output of a job. For example, when one hundred sheets are present as all sheets of the job and the user designates sheets as "2, 4-5", the control unit overlays image stamp data such as "2/100", "4/100", and "5/100" at the time when the one hundred sheets are output. Thereafter, the control unit ends the procedure.

In step S404, the control unit sets page stamp processing on the basis of sheet information during an output of the designated sheets. For example, when one hundred sheets are present as all sheets of the job and the user designates sheets as "2, 4-5", the control unit overlays image stamp data such as "1/3", "2/3", and "3/3" at the time three sheets are output. Thereafter, the control unit ends the procedure.

Figure 13:
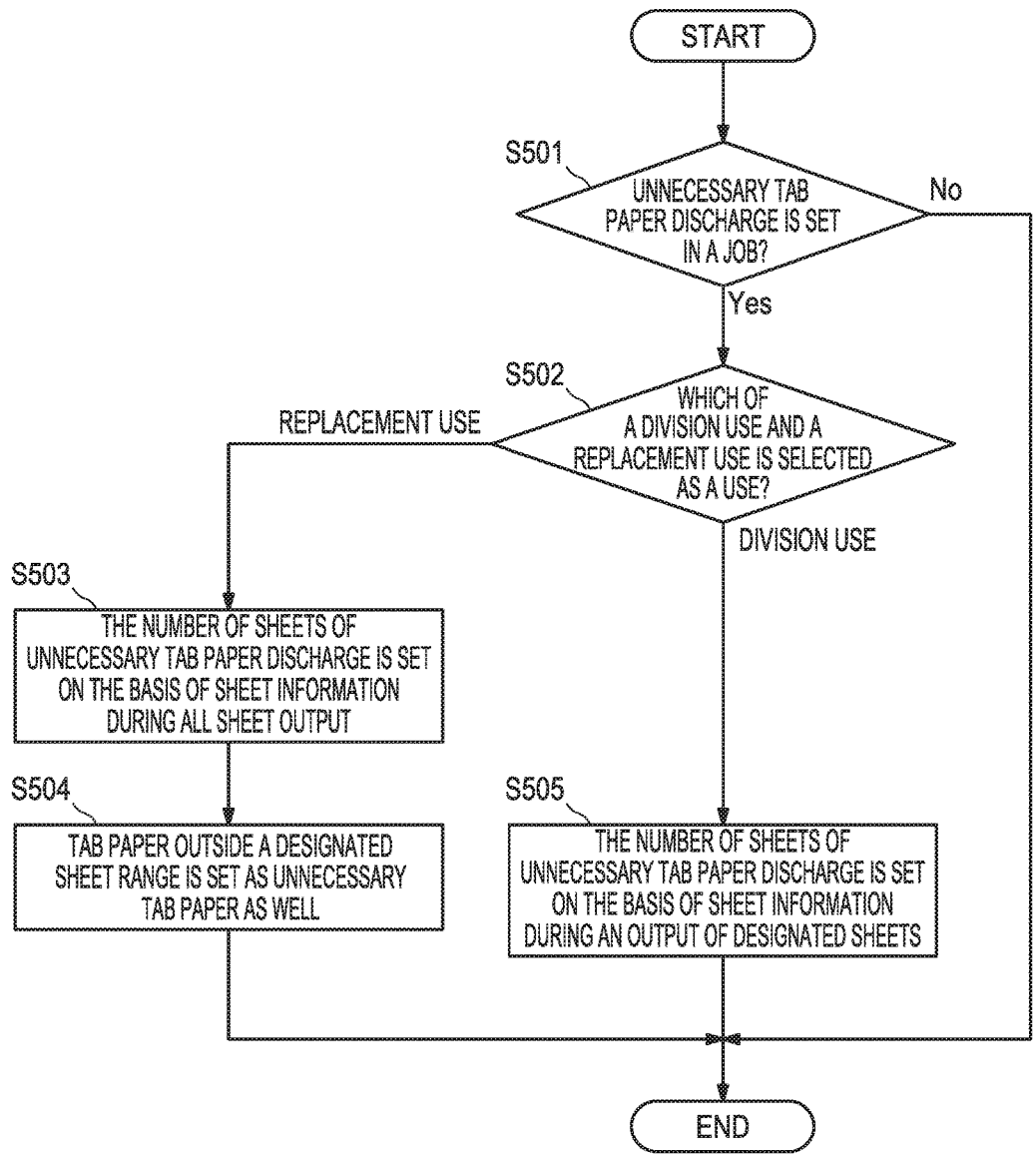
FIG. 13 is a flowchart for explaining a procedure for determining, when unnecessary tab paper discharge is set as the job mode, how unnecessary tabs are set in the embodiment.

In a flowchart of FIG. 13, when unnecessary tab paper discharge is set in the job mode, the control unit determines how unnecessary tabs are set. Note that the following procedure is executed by control of the control unit. The control unit executes the image formation control program of the present invention.

First, the control unit determines whether unnecessary tab paper discharge is set in a job (step S501). When the unnecessary tab paper discharge is set in the job (Yes in step S501), the control unit shifts to step S502. When the unnecessary tab paper discharge is not set in the job (No in step S501), the control unit ends the procedure.

In step S502, the control unit determines which of a division use and a replacement use is selected as a use. In the case of the replacement use (replacement use in step S502), the control unit shifts to step S503. In the case of the division use (division use in step S502), the control unit shifts to step S505.

Figure 15:
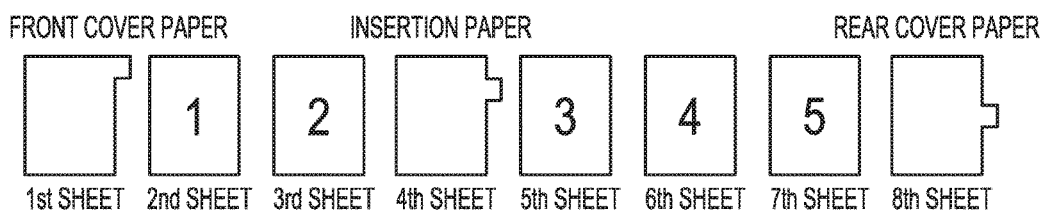
FIG. 15 is a diagram showing an example of tab pager in the embodiment.

In step S503, the control unit sets the number of sheets of unnecessary tab paper discharge on the basis of sheet information during all sheet output of the job. For example, when five pieces of tab paper are put in a paper feeding tray per one set and the job is set as shown in FIG. 15, the control unit treats a fourth tab and a fifth tab put in the paper feeding tray as unnecessary tab paper. Thereafter, the control unit shifts to step S504.

In step S504, the control unit sets tab paper outside a designated sheet range as unnecessary tab paper as well. For example, in addition to the example of the procedure explained above, when the user inputs "3-5", the control unit treats a first tab and a third tab put in the paper feeding tray as unnecessary tab paper as well. Thereafter, the control unit ends the procedure.

In step S505, the control unit sets the number of sheets of unnecessary tab paper discharge on the basis of sheet information during an output of designated sheets. For example, in addition to the example of the procedure explained above, when the user inputs "3-5", the control unit sets a fourth sheet as a first tab and treats the remaining second to fifth tabs as unnecessary tab paper. Thereafter, the control unit ends the procedure.

Figure 14:
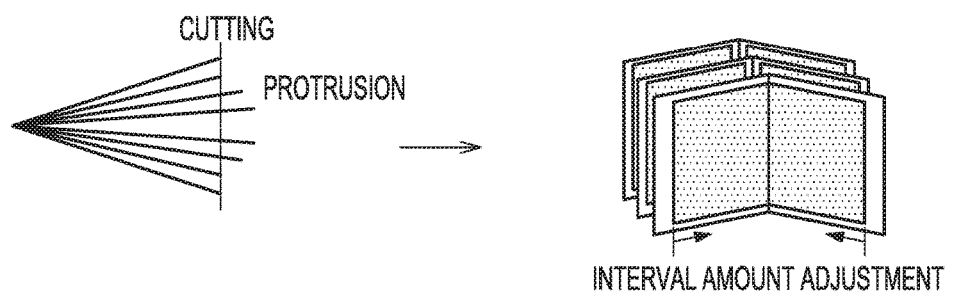
FIG. 14 is a diagram for explaining a shift amount during inner offset (image creeping) in the embodiment.

A shift amount during inner offset (image creeping) is specifically explained with reference to FIG. 14.

When saddle binding is carried out on a booklet (a weekly magazine), paper further on the inner side protrudes to the outer side because of the thickness of the paper. Therefore, the inner offset is a function for preventing, when the booklet is cut, a margin amount from a cut surface to an image end from changing on the outer side and the inner side.

An inter-page interval amount of the inner offset with respect to a page interval on the outermost side is set. A page interval amount of pages is determined according to a set value and the number of pieces of transfer paper.

The unnecessary tab paper discharge is specifically explained.

Figure 16:
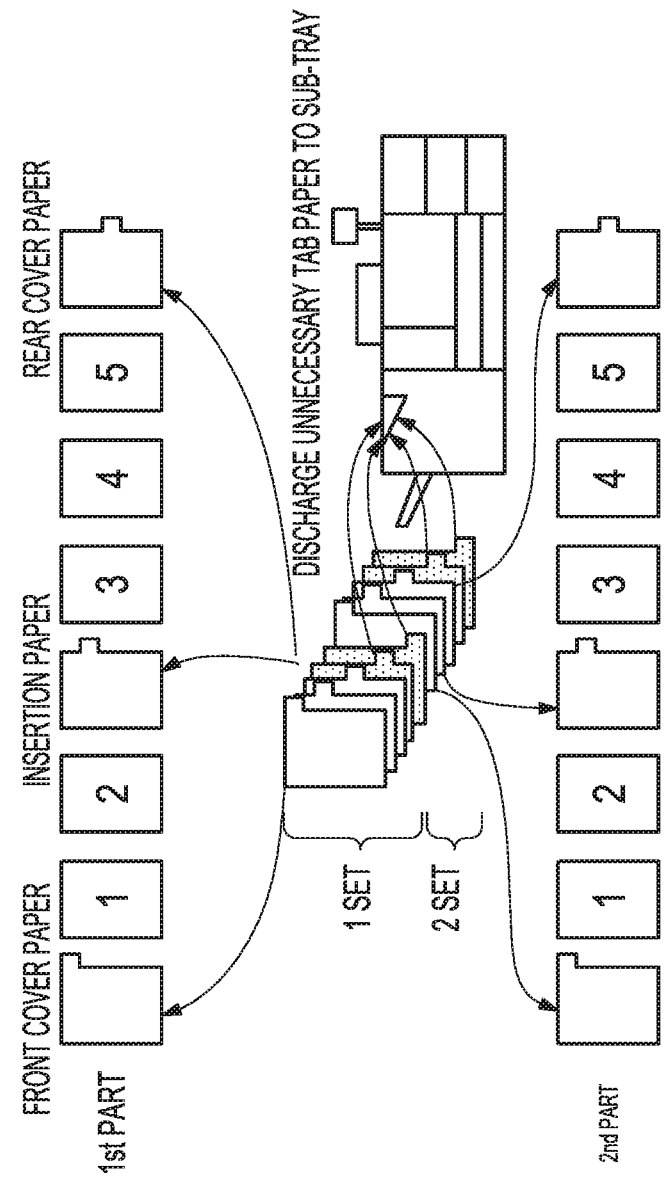
FIG. 16 is a diagram for explaining the unnecessary tab paper discharge in the embodiment.

Tab paper is sold with the number of tabs per one set determined in advance as shown in FIG. 15. In an example shown in FIG. 16, five tabs are set per one set. The pieces of tab paper are directly set in a paper feeding tray. The user sets the number of tabs per one set in advance before an output of a job. When a job in which "unnecessary tab paper discharge=ON" is set is output, the number of unnecessary tabs is automatically calculated and the unnecessary tabs are discharged to a sub-tray.

In an example shown in FIG. 15, pieces of tab paper of front cover paper, insertion paper, and rear cover paper are set. A fourth tab and a fifth tab put in the paper feeding tray are discharged to the sub-tray as unnecessary tab paper.

The number of pieces of unnecessary tab paper can be calculated by the following equation.

(The number of pieces of unnecessary tab paper discharge paper)=(the number of tabs per one set)−a remainder of [(the number of tabs in use per one set)/(the number of tabs per one set)]

As explained above, according to this embodiment, when designated sheets are output as sheets for replacement media, it is possible to execute control content different from control content at the time when the designated sheets are not output as the sheets for the replacement media.

The present invention is explained above on the basis of the embodiment. However, this embodiment can be changed as appropriate as long as the change does not deviate from the scope of the present invention.

What is claimed is:

1. An image forming apparatus including:
   an image forming unit that forms an image on a transfer medium and outputs the transfer medium with the image formed thereon, based on a job, the transfer medium comprising a plurality of sheets; and
   a control unit that controls the image forming apparatus, wherein:
   the control unit is selectively operable, in accordance with an input instruction, to control the image forming apparatus to one of (i) output all sheets of the job, and (ii) output designated sheets of the job which are designated by a user,
   the control unit is operable to receive an instruction indicating whether or not the designated sheets are to be output as sheets for replacement media, in a case in which the control unit receives the instruction to output the designated sheets,
   the control unit is configured to determine whether to change output control content for the designated sheets based on the instruction indicating whether or not the designated sheets are to be output as sheets for replacement media, and based further on a type of the output control content set for the job, and the control unit is configured to change the output control content for the designated sheets depending on a result of the determination, the output control content comprises at least one of information about post-processing to be applied to output sheets, information about image formation on output sheets, information about the transfer medium, and information about an ejection tray.

2. The image forming apparatus according to claim 1, wherein, when outputting the designated sheets as the sheets for the replacement media, the control unit selects, according to content of all sheet output time sheet information, whether the output control content is set as output control content same as output control content other than output control content of the sheets for the replacement media or set as output control content different from the output control content other than the output control content of the sheets for the replacement media.

3. The image forming apparatus according to claim 2, wherein, when outputting the designated sheets as the replacement media, the control unit selects, according to the content of the all sheet output time sheet information, whether the output of the designated sheets is an output based on the all sheet output time sheet information or an output with the all sheet output time sheet information temporarily released.

4. The image forming apparatus according to claim 3, wherein, in the output with the all sheet output time sheet information temporarily released, the control unit performs the output according to sheet information during the output of the designated sheets.

5. The image forming apparatus according to claim 3, wherein, when outputting the designated sheets other than the sheets for the replacement media, the control unit outputs the designated sheets according to the all sheet output time sheet information.

6. The image forming apparatus according to claim 2, wherein the all sheet output time sheet information includes a binding processing mode.

7. The image forming apparatus according to claim 6, wherein, when outputting the designated sheets as the replacement media, if the all sheet output time sheet information includes the binding processing mode, the control unit temporarily releases the binding processing mode depending on a sheet range of the designated sheets, and performs the output.

8. The image forming apparatus according to claim 6, wherein, when the binding processing mode is a binding processing of a subset and the designated sheets are output as the sheets for the replacement media, the control unit does not release the binding processing mode and outputs the designated sheets when a sheet range coinciding with a range of the binding processing of the subset is designated.

9. The image forming apparatus according to claim 2, wherein the all sheet output time sheet information includes a page stamp.

10. The image forming apparatus according to claim 9, wherein, when outputting the designated sheets as the sheets for the replacement media, the control unit controls the job with the page stamp for giving a page number in a sheet unit of the all sheet output time sheet information.

11. The image forming apparatus according to claim 2, wherein, when an inner offset during a booklet mode is set in the all sheet output time sheet information, if the designated sheets are output as the sheets for the replacement media, the control unit controls the job with an inner offset value in a sheet unit in the all sheet output time sheet information.

12. The image forming apparatus according to claim 1, wherein the control unit is capable of setting whether the designated sheets are output for replacement in accordance with the received instruction.

13. The image forming apparatus according to claim 1, wherein, when an output method is an output in a wait/proof mode, the control unit excludes, from an operation target, items other than a set number of prints in a job mode displayed on a display for checking the job.

14. The image forming apparatus according to claim 1, wherein, when an unnecessary tab paper discharge mode is set, in outputting the designated sheets as the sheets for the replacement media, the control unit controls, as an unnecessary tab medium, an index medium outside a designated sheet range in addition to a calculation method for an unnecessary tab during the all sheet output.

15. The image forming apparatus according to claim 1, wherein, when the designated sheets are output as the sheets for the replacement media, the control unit discharges the replacement medium to a paper discharge destination different from a normal output destination.

16. The image forming apparatus according to claim 1, wherein the control unit sets, according to the input instruction which is from outside the image forming apparatus, whether the output of all the sheets or the output of the designated sheets is performed.

17. The image forming apparatus according to claim 16, wherein the control unit outputs the designated sheets as the replacement media according to the instruction from outside the image forming apparatus.

18. An image formation management apparatus that manages an image forming apparatus that forms an image on a transfer medium and outputs the transfer medium with the image formed thereon, based on a job, the transfer medium comprising a plurality of sheets, the image formation management apparatus comprising a processor that controls the image forming apparatus, wherein:

the processor is selectively operable, in accordance with an input instruction, to control the image forming apparatus to one of (i) output all sheets of the job, and (ii) output designated sheets of the job which are designated by a user;

the processor is operable to receive an instruction indicating whether or not the designated sheets are to be output as sheets for replacement media, in a case in which the processor receives the instruction to output the designated sheets;

the processor is configured to determine whether to change instruction content of output control for the designated sheets based on the instruction indicating whether or not the designated sheets are to be output as sheets for replacement media, and based further on a type of the output control content set for the job;

the processor is configured to change the instruction content of the output control for the designated sheets depending on a result of the determination; and the output control content comprises at least one of information about post-processing to be applied to output sheets, information about image formation on output sheets, information about the transfer medium, and information about an ejection tray.

19. The image formation management apparatus according to claim 18, wherein the processor is capable of instructing the image forming apparatus to execute an output of the designated sheets as the sheets for the replacement media.

20. A non-transitory computer-readable recording medium having stored therein an image formation control program executable by a computer that controls an image forming apparatus that forms an image onto a transfer medium and outputs the transfer medium with the image formed thereon, based on a job, the transfer medium comprising a plurality of sheets, the image formation control program being executable by the computer to cause the computer to perform functions comprising:

selectively controlling the image forming apparatus, in accordance with an input instruction, to one of (i) output all sheets of the job, and (ii) output designated sheets of the of the job which are designated by a user;

receiving an instruction indicating whether or not the designated sheets are to be output as sheets for replacement media, in a case in which the instruction to output the designated sheets is received;

determining whether to change output control content for the designated sheets based on the instruction indicating whether or not the designated sheets are to be output as sheets for replacement media, and based further on a type of the output control content set for the job; and changing the output control content for the designated sheets depending on a result of the determination;

wherein the output control content comprises at least one of information about post-processing to be applied to output sheets, information about image formation on output sheets, information about the transfer medium, and information about an ejection tray.

21. The non-transitory computer-readable recording medium according to claim 20, further comprising selecting, when the designated sheets are to be output as the sheets for the replacement media, according to content of all sheet output time sheet information, whether an output based on the all sheet output time sheet information is performed or an output with the all sheet output time sheet information temporarily released is performed.

* * * * *